Feb. 17, 1970  O. D. TREIBER  3,495,682
JET ENGINE EXHAUST SILENCER CONSTRUCTION
Filed Feb. 28, 1968  2 Sheets-Sheet 1
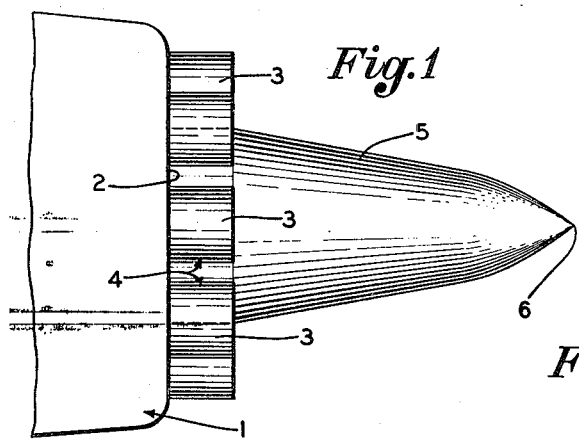
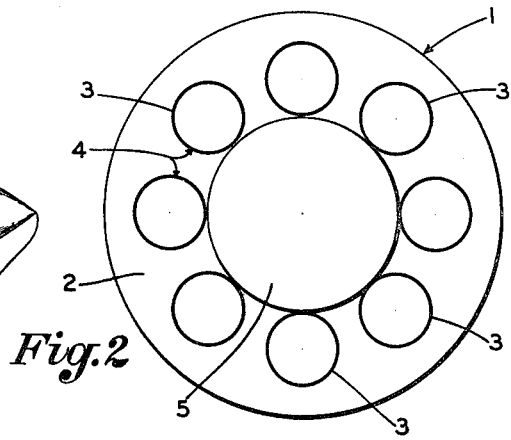
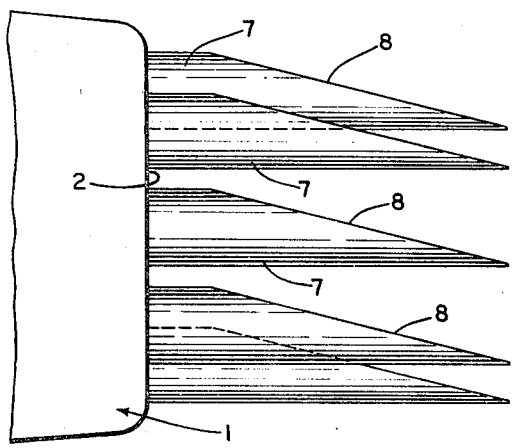
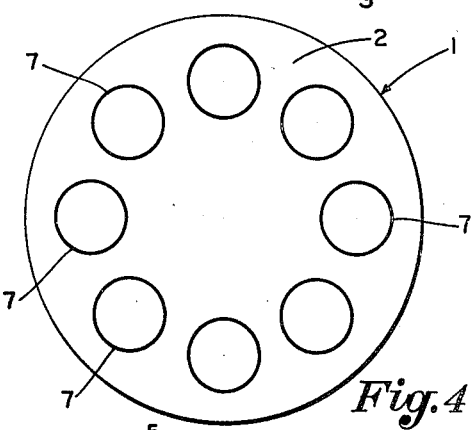
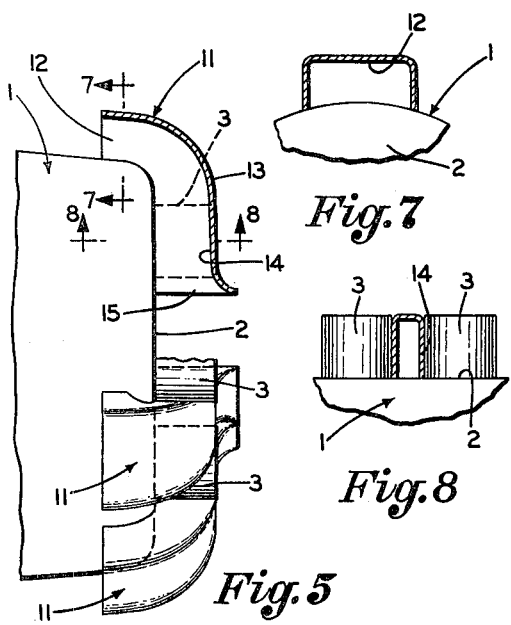
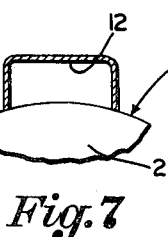
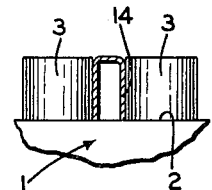
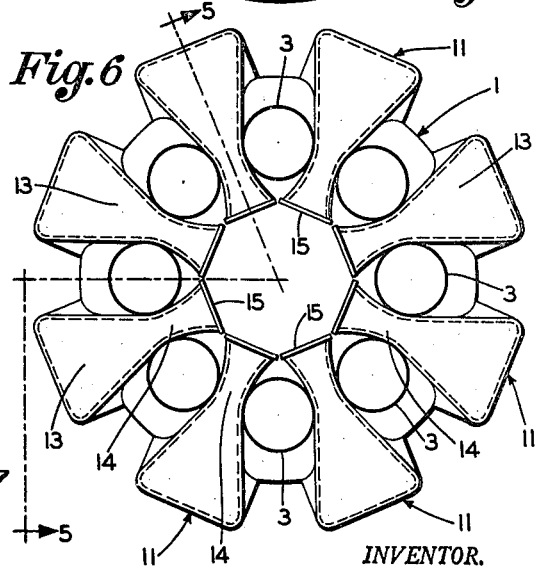
INVENTOR.
Otis D. Treiber
BY
Frease & Bishop
ATTORNEYS Feb. 17, 1970     O. D. TREIBER     3,495,682
JET ENGINE EXHAUST SILENCER CONSTRUCTION
Filed Feb. 28, 1968     2 Sheets-Sheet 2
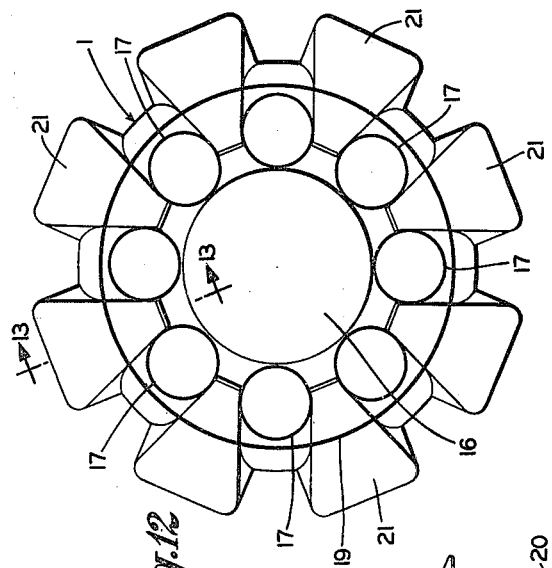
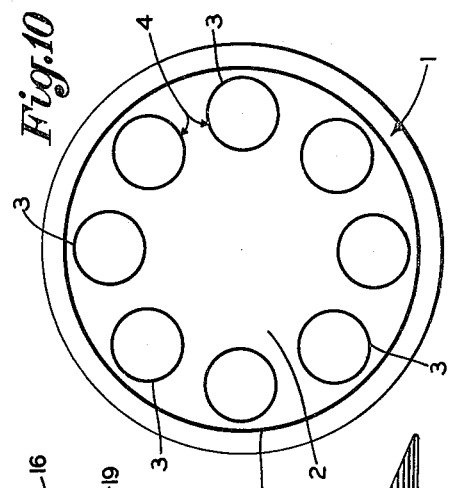
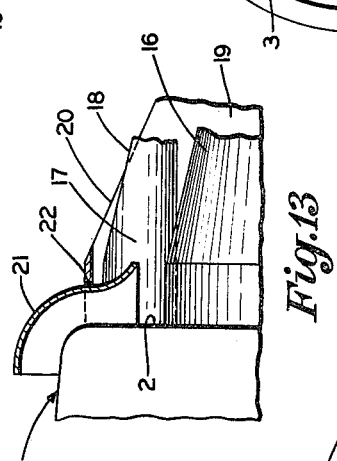
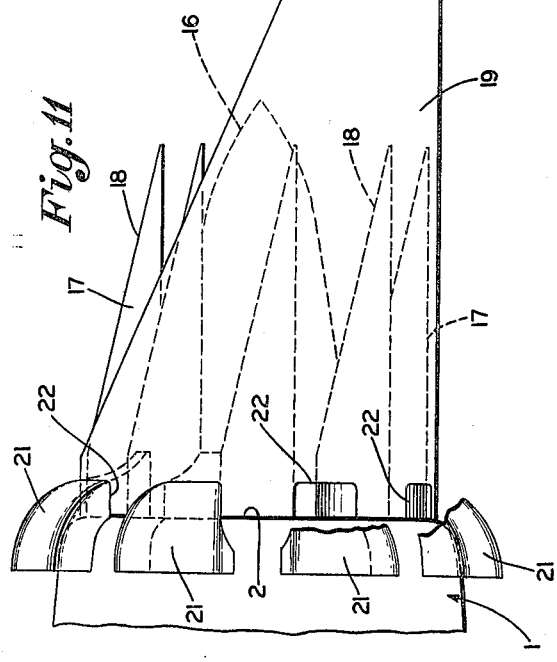
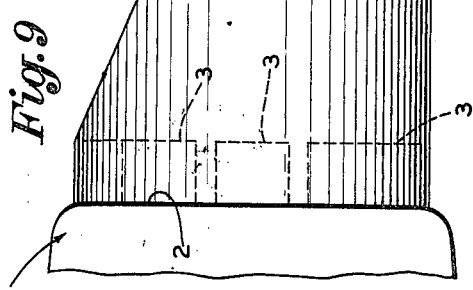
INVENTOR.
*Otis D. Treiber*
BY
*Frease & Bishop*
ATTORNEYS

United States Patent Office 3,495,682
Patented Feb. 17, 1970

3,495,682
JET ENGINE EXHAUST SILENCER
CONSTRUCTION
Otis D. Treiber, 1700 NW. North River Drive,
Miami, Fla. 33125
Filed Feb. 28, 1968, Ser. No. 709,082
Int. Cl. F01n 3/04
U.S. Cl. 181—51                                    9 Claims

ABSTRACT OF THE DISCLOSURE

Noise originating from exhaust gas and vacuum collapse within an envelope formed by exhaust gas streams of airplane jet engines is controlled, modified, minimized, or silenced by beveled extensions for or surrounding the engine burner nozzles directing such noises upward and away from the earth's surface; and/or by a pyramid-like enclosure projecting within and beyond the confines of the location of the burner nozzles having the approximate shape of the vacuum envelope which otherwise can form; and/or by scoop means delivering air to the location of the vacuum envelope.

BACKGROUND OF THE INVENTION

Field of the invention

The invention relates to jet engines and more particularly to an exhaust construction for airplane jet engines tending to silence the noise produced by jet engine exhaust, or to minimize the noise reaching the earth's surface from the exhaust of jet planes moving through the sky.

Description of the prior art

The term "noise" used below in the analysis of existing problems refers to audible vibrations in the air. Noise produced in the operation of airplanes may be classified as falling in at least four different categories:

(1) Noise is produced by the movement of a plane through the air by entering and leaving any given parcel of air. Noise originating in this manner is characterized by high frequency and relatively low amplitude sound waves.

(2) Noise also is produced by the operation of airplane compressor and turbine blades. This noise is characterized by very high frequency and medium amplitude sound waves.

(3) Noise is produced by the exhaust gases (herein called "exhaust gas noise") emerging from the burners of a jet engine which produce eddies and the collapse of local negative relative pressure on the adjacent air layer. Exhaust gas noise is characterized by high frequency and medium amplitude sound waves.

(4) Noise is produced by the vacuum collapse (herein called "vacuum collapse noise") of a void between the burner exhausts of a jet engine and the after end of the engine pod. Vacuum collapse noise is characterized by fairly low frequency and great amplitude sound waves which resemble thunder.

Noise vibrations or their characterizing sound waves travel through metal where they may be either amplified or squelched. A flat metal surface, especially if its natural frequency is an harmonic of the noise vibration can increase "noise". A round surface is not conducive to a vibration frequency in the sense of this analysis.

The exhaust gas (3) and vacuum collapse (4) noise categories are those which primarily are controlled, modified, minimized or silenced by the new jet engine exhaust structural concept of the invention.

I am not aware of any prior proposals, arrangements or constructions which are directed to silencing exhaust gas or vacuum collapse noise arising from operation of jet engine airplanes or to minimizing the tendency of such noise to reach the earth's surface from jet planes moving through the atmosphere above the earth.

SUMMARY OF THE INVENTION

The relative velocity of emerging burner gas and adjacent air (which produce exhaust gas noise) is relatively high, causing localized air turbulence-producing eddies, occlusions and small partial vacuum pockets. The eddies and occlusions generate audible vibration. Also the collapse of the partial vacuum produces miniature thunder vibrations. These noises of varied origins are not readily separated, nor do they need to be for they add up to high frequency and medium amplitude sound waves similar to the noise produced by compressed air or steam escaping into the atmosphere.

The vacuum collapse noise occurring at the rear end of the jet engine pod is akin to continuous thunder, being of relatively low frequency but of tremendous amplitude. The vacuum space where the vacuum collapse occurs, is defined or bounded by the gases or gas streams emerging from the burner nozzles and by that portion of the rear end of the pod which is surrounded by the burner nozzles. The rear end of the pod usually has a flat surface and thus makes an excellent sounding board.

The vacuum in the space of considerable volume thus surrounded by the emerging exhaust gases, is produced by the gas stream flow of the emerging burner nozzle gases. These nozzles ordinarily are arranged in a circle around the outer zone of the rear end of the pod.

The emerging gases from one particular burner nozzle expands to join adjacent gas streams emerging from adjacent nozzles. This produces a circular envelope extending a variable distance from the pod. The distance is a function of the gas velocity and pressure, the air density, and the relative speed of air and gas.

The circularly-arranged nozzle streams converge at a short distance away from the ends of the nozzles tending to close the circular envelope at a location spaced from the rear end of the pod. Because of the circular arrangement of the burner nozzles and of the converging gas streams emerging from the nozzles, the inner halves of the nozzle streams move toward the center, thus crowding one another toward the center and finally sealing the circular envelope at the outer end remote from the end of the pod.

The syphon effect of the gases moving from the nozzles quickly evacuates the envelope of air. The envelope only can be replenished with air through the relatively small partially wedge-shaped openings or spaces which exist and are located between adjacent burner nozzles and which communicate with the circular gas envelope. These openings, however, are not of adequate size to prevent the formation of a vacuum in the envelope, except at low relative speed of nozzle-emerging-gas and ambient air, such as is experienced at low plane speeds and/or slow jet turbine speeds.

When the vacuum is sufficient to overcome the eddying gas pressure within the envelope, the vacuum collapses resulting in vibration similar to thunder produced when lightning makes a vacuum in the air. The flat wall at the rear of the pod may augment the amplitude of these vibrations; and such vibrations travel through the gas generally in the direction of gas flow of the gases emerging from the burner nozzles.

Such vacuum collapses do not occur or are greatly damped at low gas speed, as would be expected. However, when vacuum collapse does occur at high speed, the collapses are of sufficiently high frequency that the human ear cannot distinguish them separately. As a result they are apparently continuous and may be very severe like thunder.

Thus, exhaust gas and vacuum collapse noise categories (3) and (4), present separate problems. However, in accordance with the invention, these problems may be solved in partial unison.

Objectives of the invention thus include providing means for directing jet engine exhaust gas and vacuum collapse noise upward and away from the earth's surface; providing means for eliminating the space within a sealed envelope where vacuum collapse can occur to prevent vacuum collapse; providing a source of air for the space within the envelope where a vacuum tends to form to prevent the formation of the vacuum; providing these means severally or in combination in accordance with requirement and characteristics of the jet engine involved to silence exhaust gas and vacuum collapse noises resulting from jet engine airplane operation; and providing such means to eliminate the state noises heretofore encountered in the art, simple, effectively and inexpensively, thereby solving problems and satisfying existing needs.

These objectives and advantages are obtained by the various structures described below, the general nature of which may be stated as including severally or collectively forming beveled extensions for or surrounding the burner nozzles to direct the exhaust gas noises upward and away from the earth's surface; forming a cone or pyramid-like extension on the rear end surface of the jet engine pod projecting within and beyond the confines of the burner nozzles with the approximate shape of the vacuum envelope which otherwise may form, so as to prevent the formation of the vacuum envelope and its collapse; and forming scoop means communicating outside the periphery of the pod to scoop air and deliver it between the burner nozzles to the location of the vacuum envelope, thereby preventing the formation of a vacuum envelope.

BRIEF DESCRIPTION OF THE DRAWINGS

Preferred embodiments of the invention—illustrative of the best modes in which applicant has contemplated applying the principles—are set forth in the following description and shown in the drawings and are particularly and distinctly pointed out and set forth in the appended claims:

FIGURE 1 of the drawings is a diagrammatic view illustrating an end portion of a pod of a jet engine with burner nozzles projecting therefrom provided with a cone or pyramid-like enclosure projecting from the end wall of the pod to prevent the formation of a vacuum envelope;

FIG. 2 is an end view looking toward the right end of FIG. 1;

FIG. 3 is a view similar to FIG. 1 but illustrating burner nozzle extensions beveled off to direct exhaust gas noise upward and away from the earth's surface;

FIG. 4 is an end view of the construction shown in FIG. 3;

FIG. 5 is a view similar to FIGS. 1 and 3, with parts broken away and in section, as on the line 5—5, FIG. 6, showing scoop ducts mounted on the pod to deliver air to the location of the vacuum envelope to prevent the formation of a vacuum;

FIG. 6 is an end view looking toward the right end of FIG. 5;

FIG. 7 is a fragmentary section looking in the direction of the arrows 7—7, FIG. 5;

FIG. 8 is a fragmentary section looking in the direction of the arrows 8—8, FIG. 5;

FIG. 9 is a view similar to FIGS. 1, 3 and 5 illustrating an extended beveled off housing surrounding the burner nozzles to direct exhaust gas noise upward and away from the earth's surface;

FIG. 10 is an end view of the parts shown in FIG. 9;

FIG. 11 is a view similar to FIGS. 1, 3, 5 and 9 illustrating a jet engine pod provided with a combination of the various silencing structures illustrated in FIGS. 1, 3, 5 and 9;

FIG. 12 is an end view looking toward the right end of FIG. 11; and

FIG. 13 is a fragmentary sectional view looking in the direction of the arrows 13—13, FIG. 12.

Similar numerals refer to similar parts throughout the drawings.

DESCRIPTION OF THE PREFERRED EMBODIMENTS

The embodiments in general

Exhaust gas and vacuum collapse noise of jet engine planes is controlled, modified, minimized, or silenced in accordance with the concepts of the invention by several different structural arrangements, any one of which may be used indiivdually or two or more or all may be used in combination.

The silencing structure or combination of silencing structures to be used may depend upon the characteristics of the particular engine for which noise control is to be provided. In certain instances the several or collective use of one or more or all of the noise control structures may have to be determined by tests with respect to any particular engine because of the variations in engine characteristics that may be encountered from which the noise to be controlled originates.

Thus, literally the various silencing or control means will be described herein below as different embodiments, it being understood that each structure may be used alone or in combination with one or more or all of the other control structures.

First embodiment

The rear end portion of a typical pod of a jet turbine airplane engine is indicated generally at 1 in the drawings. The pod 1 may have a flat rear wall 2. Typical burner nozzles 3 are arranged in a circle around the outer zone of the rear end of pod 1 and project rearwardly of the read pod wall 2, as shown. The engine may have any desired number of burner nozzles 3, eight being shown merely for the purpose of illustration. There are spaces indicated by the two-pronged arrow 4 between each pair of adjacent burner nozzles 3.

FIGURES 1 and 2 illustrate a cone-like or pyramid-like enclosure 5 projecting within and beyond the confines of the location of the burner nozzles 3. The pyramid-like enclosure 5 projects rearwardly from the rear pod wall 2 a considerable distance, as shown. The shape or contour of the enclosure 5 approximates the shape of the vacuum envelope which otherwise can form within the converging gas streams of exhaust gases which emerge from the nozzles 3. These converging streams normally will form a vacuum envelope which is finally sealed at the location of the point or tip 6 of enclosure 5 if the enclosure 5 is not provided.

Thus, the space enclosed by enclosure 5, in the absence of the enclosure 5, would constitute the vacuum envelope formed by the exhaust gas streams emerging from the burner nozzles 3. The provision of the enclosure 5 having the shape of and occupying the space of the vacuum envelope which otherwise could form, prevents the formation of the vacuum envelope and thus prevents or eliminates noise originating from vacuum collapse of the vacuum envelope identified herein as vacuum collapse noise.

Second embodiment

Referring to FIGS. 3 and 4, the burner nozzles 7 are extended and have an increased length of three to six times the diameter of the nozzle. The extended nozzles 7 are beveled off as indicated at 8 with the beveled side pointing substantially upward with reference to the earth's surface, as shown in FIG. 3. The upward bevel 8 of the nozzles 7 largely prevents noise vibrations, originating from gas emerging from the nozzles into the air, from traveling downward toward the earth's surface. Substantially all of the noise vibrations will travel upward or sideways to minimize their being heard by inhabitants of the earth.

Third embodiment

Referring to the structure shown in FIGS. 9 and 10, a large beveled exhaust sleeve 9 cut on an angle at 10 with the beveled side 10 pointing upward surrounds all of the exhaust nozzles 3. The bevel is cut preferably to have a length of from two to five diameters of the sleeve 9. The sleeve 9 largely prevents noise vibrations from gas emerging from the nozzles into the air from traveling downward toward the inhabited earth in a manner similar to that described in connection with FIGS. 3 and 4.

Fourth embodiment

The noise control structure shown in FIGS. 5, 6, 7 and 8 involves the provision of scoops generally indicated at 11. It was indicated in describing the burner nozzles 3 of FIGS. 1 and 2 that there are spaces 4 between adjacent nozzles 3. In the absence of the pyramid-like enclosure 5, a vacuum envelope can form from which vacuum collapse noise can originate. The air scoops 11 have inlet openings 12 which open forwardly of the pod. Scoops 11 curve radially inwardly at 13 and form a narrow passage 14 between adjacent burner nozzles 3. Each air scoop 11 has an outlet opening 15 communicating with the space within the confines of the circularly-arranged nozzles 3 where the vacuum envelope tends to form.

The air scoops 11, however, deliver air to the location where the vacuum envelope tends to form, thus preventing the formation of a vacuum. The scoops 11 may perform the further function of providing air for the combustion of unburned carbon and hydrocarbons emerging from the burner nozzles.

Combined embodiment

FIGURES 11 to 13 illustate the combined or collective use of all of the noise control and silencing means illustrated and described in FIGS. 1 to 10.

First of all, a pyramid-like enclosure 16 projects rearwardly of the rear wall 2 of pod 1, similar to the enclosure 5 of FIGS. 1 and 2, and functions in the same manner.

Next, the burner nozzles are extended at 17 and are beveled off at 18 similar to the burner nozzles 7 beveled at 8 shown in FIG. 3. These extended nozzles 17 function the same as extended nozzles 7.

Next, an outer sleeve surrounding the nozzles 17 is provided at 19, feveled off at 20 similar in structure and function to the sleeve 9 of FIG. 9.

Finally, scoops 21 are provided extending through openings 22 in sleeve 19 to deliver air within the sleeve 19 and between the nozzles 17 and around the pyramid enclosure 16. The air delivered by scoops 21 supplies additional air for combustion and prevents the formation of a vacuum anywhere within sleeve 19 and around and within the confines of the burner nozzles 17.

Operation of control and silencing structures

As described, the various noise control and silencing structures illustrated severally or collectively in the various figures of the drawings either prevent noise vibrations from traveling downward toward the earth or prevent the formation of a vacuum and thus prevent vacuum collapse. In this manner, exhaust gas and vacuum collapse noises are controlled, modified, minimized, or silenced.

The improved structures are simplified and provide effective means for silencing or minimizing jet engine noise and thus solve problems that have existed in the art, and achieve the described objectives.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown diagrammatically.

I claim:

1. In a jet turbine airplane engine exhaust construction of the type in which an engine pod has a rear wall from which a series of spaced circularly-arranged burner nozzles project rearwardly, the combination of a pyramid-like enclosure having a base converging to an apex, the enclosure base being mounted on the rear pod wall and extending rearwardly of the pod within the confines of the circularly-arranged burner nozzles; a nozzle extension on each nozzle, the nozzle extensions each being cut on a bevel angle of from three to six diameters to form a beveled side; an exhaust sleeve mounted on and projecting from the rear pod wall surrounding all exhaust nozzles, said sleeve being cut on a bevel angle of from two to five diameters to form a beveled side, the beveled sides of all nozzles and the sleeve facing upwardly with reference to the earth's surface when the airplane is in flight; air scoop means mounted on the pod, said air scoop means including a series of scoop members each formed with a passageway and having an inlet opening directed and facing forwardly around the outside of the pod, said passageway of each member communicating through the sleeve and one of the spaces between adjacent burner nozzles with the zone located within the circularly-arranged nozzles and behind the pod rear wall and around the pyramid-like enclosure.

2. The construction defined in claim 1 in which the pyramid-like enclosure has an external configuration conforming to the shape and size of a vacuum envelope formed in the absence of such enclosure by exhaust gases emerging from the burner nozzles, whereby the presence of the enclosure prevents the formation of a vacuum envelope and its collapse, thereby eliminating vacuum collapse noise; and in which the upward facing of the beveled sides of the nozzles and sleeve largely prevent noise vibrations originating from gas emerging from the nozzles into the air from traveling downward in a direction opposite to that faced by the nozzle beveled sides.

3. The construction defined in claim 1 in which each scoop member terminates in an outlet opening directed within and toward gas streams emerging from the burner nozzles, whereby air scooped by the scoop means into said scoop member inlet openings is discharged through said outlet openings into said gas streams for combustion of unburned carbon and hydrocarbons contained therein.

4. In jet turbine airplane engine exhaust construction of the type in which an engine pod has a rear wall from which a series of circularly-arranged burner nozzles project rearwardly, the combination of a pyramid-like enclosure having a base converging to an apex, and the enclosure base being mounted on the rear pod wall and extending rearwardly of the pod within the confines of the circularly-arranged burner nozzles.

5. The construction defined in claim 4 in which the pyramid-like enclosure has an external configuration conforming to the shape and size of a vacuum envelope formed in the absence of such enclosure by exhaust gases emerging from the burner nozzles, whereby the presence of the enclosure prevents the formation of a vacuum envelope and its collapse, thereby eliminating vacuum collapse noise.

6. In jet turbine airplane engine exhaust construction of the type in which an engine pod has a rear wall from which a series of circularly-arranged burner nozzles project rearwardly, the combination of a nozzle extension on each nozzle, the nozzle extensions each being cut on a bevel angle of from three to six diameters to form a beveled side, and the beveled sides of all nozzles facing upwardly with reference to the earth's surface when the airplane is in flight, whereby noise vibrations originating from gas emerging from the nozzles into the air are largely prevented from traveling downward in a direction opposite to that faced by the nozzle beveled sides.

7. In jet turbine airplane engine exhaust construction of the type in which an engine pod has a rear wall from which a series of circularly-arranged burner nozzles project rearwardly, the combination of an exhaust sleeve mounted on and projecting from the rear pod wall surrounding all exhaust nozzles, said sleeve being cut on a bevel angle of from two to five diameters to form a beveled side, the beveled side of said sleeve facing upwardly with reference to the earth's surface when the airplane is in flight.

8. In jet turbine airplane engine exhaust construction of the type in which an engine pod has a rear wall from which a series of spaced circularly-arranged burner nozzles project rearwardly, the combination of air scoop means mounted on the pod, said air scoop means including a series of scoop members each formed with a passageway and having an inlet opening directed and facing forwardly around the outside of the pod, said passageway of each member communicating through one of the spaces between adjacent burner nozzles with the zone located within the circularly-arranged nozzles and behind the pod rear wall.

9. The construction defined in claim 8 in which each scoop member terminates in an outlet opening directed within and toward gas streams emerging from the burner nozzles, whereby air scooped by said scoop means into said scoop member inlet openings is discharged through said outlet openings into said gas streams for combustion of unburned carbon and hydrocarbons contained therein.

References Cited

UNITED STATES PATENTS

| 3,027,710 | 4/1962 | Maytner | 239—265.13 |
| 3,187,835 | 6/1965 | Smith. | |
| 3,392,529 | 7/1968 | Pike et al. | 239—265.13 |

FOREIGN PATENTS 894,298  4/1962  Great Britain.

ROBERT S. WARD, JR., Primary Examiner

U.S. Cl. X.R.

181—60